United States Patent
Li et al.

(10) Patent No.: US 10,341,710 B2
(45) Date of Patent: Jul. 2, 2019

(54) PROGRAM RECORDING METHOD AND DEVICE, AND SET TOP BOX

(71) Applicant: ZTE CORPORATION, Shenzhen, Guangdong Province (CN)

(72) Inventors: Ronghui Li, Shenzhen (CN); Xiaojun Li, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 15/739,785

(22) PCT Filed: Jun. 6, 2016

(86) PCT No.: PCT/CN2016/084995
§ 371 (c)(1),
(2) Date: Dec. 26, 2017

(87) PCT Pub. No.: WO2017/000751
PCT Pub. Date: Jan. 5, 2017

(65) Prior Publication Data
US 2018/0343486 A1    Nov. 29, 2018

(30) Foreign Application Priority Data
Jun. 30, 2015  (CN) .......................... 2015 1 0374388

(51) Int. Cl.
*H04N 21/4147* (2011.01)
*H04N 5/76* (2006.01)
(Continued)

(52) U.S. Cl.
CPC ......... *H04N 21/4147* (2013.01); *H04N 5/445* (2013.01); *H04N 5/76* (2013.01);
(Continued)

(58) Field of Classification Search
CPC ...... H04N 21/4147; H04N 5/445; H04N 5/76; H04N 21/4622; H04N 21/482
See application file for complete search history.

(56) References Cited

U.S. PATENT DOCUMENTS 8,028,315 B1 *  9/2011  Barber ............... H04N 21/4334
                                                      463/42
2003/0113100 A1   6/2003  Hecht et al.
(Continued)

FOREIGN PATENT DOCUMENTS

CN    1539240 A    10/2004
CN    1842152 A    10/2006
(Continued)

*Primary Examiner* — Mishawn N. Hunter
(74) *Attorney, Agent, or Firm* — Ling Wu; Stephen Yang; Ling and Yang Intellectual Property

(57) ABSTRACT

Provided are a program recording method and device, and a set top box. The method includes: acquiring, by a set top box, first Electronic Program Guide (EPG) information of a Digital Video Broadcast (DVB) and second EPG information of an Over-The-Top (OTT) service; selecting a program to be recorded from a program list integrated with the first EPG information and the second EPG information, and determining a program type of the program to be recorded; and recording the program to be recorded according to the determined program type.

8 Claims, 6 Drawing Sheets

(51) Int. Cl.
*H04N 5/445* (2011.01)
*H04N 21/4335* (2011.01)
*H04N 21/462* (2011.01)
*H04N 21/482* (2011.01)

(52) U.S. Cl.
CPC ..... *H04N 21/4335* (2013.01); *H04N 21/4622* (2013.01); *H04N 21/482* (2013.01); *H04N 2005/44547* (2013.01); *H04N 2005/44578* (2013.01)

(56) References Cited

U.S. PATENT DOCUMENTS

| | | | |
|---|---|---|---|
| 2004/0078829 A1 | 4/2004 | Patel et al. | |
| 2004/0187151 A1 | 9/2004 | Dunstan | |
| 2005/0071871 A1* | 3/2005 | Yuzawa | H04N 5/44504 725/48 |
| 2014/0337909 A1 | 11/2014 | Phillips et al. | |
| 2015/0007233 A1* | 1/2015 | Earle | H04N 21/4622 725/44 |

FOREIGN PATENT DOCUMENTS

| | | | | |
|---|---|---|---|---|
| CN | 101815205 A | | 8/2010 | |
| CN | 102413364 A | | 4/2012 | |
| CN | 103596035 A | | 2/2014 | |
| CN | 104363507 A | | 2/2015 | |
| CN | 104519295 A | | 4/2015 | |
| EP | 2012543 A1 | | 1/2009 | |
| EP | 2271083 | * | 6/2011 | ............ H04N 5/445 |
| WO | 2004064296 A2 | | 7/2004 | |

* cited by examiner

PROGRAM RECORDING METHOD AND DEVICE, AND SET TOP BOX

TECHNICAL FIELD

The present application relates to, but is not limited to, the field of communications, and more particularly to a program recording method and device, and a set top box.

BACKGROUND

In the related art, with continuous development of a digital television technology, in order to meet various user demands, new services emerge in endlessly, and a Personal Video Recorder (PVR) technology is generated accordingly. Under an environment of a Digital Video Broadcast (DVB) and a network dual-mode set top box, a program source integrates a network television program and a DVB live television program. Apparently, a user desires to record either the network television program or the DVB live television program.

In the related art, a dual-mode set top box working mode is completely separated in service, namely a DVB-mode service and a network-mode service are irrelevant. Thus, the user can only record programs separately, i.e., the user records live television under a broadcast mode and records network television under a network mode. In the related art, a local recording method under the broadcast mode and a network recording method under the network mode are also disclosed.

In the related art, for a set top box with any recording method, the user can only record a program under a certain mode. Thus, program sources selectable to be recorded are fewer, and the recorded programs are stored and managed separately, thereby increasing the usage complexity of the user.

There is no effective solution for the problem proposed in the related art that manners for recording programs by a set top box are too simple.

SUMMARY

The following is a brief introduction for a subject described herein in detail. The brief introduction is not intended to restrict the protection scope of claims.

Embodiments of the present disclosure provide a program recording method and device, and a set top box.

According to an aspect of the embodiments of the present disclosure, a program recording method is provided, which includes: acquiring, by a set top box, first Electronic Program Guide (EPG) information of a DVB and second EPG information of an Over-The-Top (OTT) service; selecting a program to be recorded from a program list integrated with the first EPG information and the second EPG information, and determining a program type of the program to be recorded; and recording the program to be recorded according to the determined program type.

In an exemplary embodiment, recording the program to be recorded according to the determined program type includes: when it is determined that the program to be recorded pertains to a DVB television program, recording the program to be recorded by using a Local Personal Video Recorder (LPVR) manner; when it is determined that the program to be recorded pertains to an OTT network video television program, recording the program to be recorded by using a Network Personal Video Recorder (NPVR) manner; and when it is determined that the program to be recorded pertains to a DVB television program and an OTT network video television program simultaneously, recording the program to be recorded by using an NPVR manner.

In an exemplary embodiment, after recording the program to be recorded according to the determined program type, the method further includes: when the program to be recorded is recorded by using the LPVR manner, the set top box stores the recorded program to be recorded on the set top box or an external storage device of the set top box; or, when the program to be recorded is recorded by using the NPVR manner, the set top box stores the recorded program to be recorded on a network server corresponding to the set top box.

In an exemplary embodiment, before determining a program type of the program to be recorded, the method further includes: carrying a type identifier in program description information about each program on the program list, herein, the type identifier is set to indicate one of the following information: a current program pertains to a DVB television program, a current program pertains to an OTT network video television program, or a current program pertains to a DVB television program and an OTT network video television program simultaneously.

In an exemplary embodiment, after recording the program to be recorded according to the determined program type, the method further includes: generating a replay page, herein, the replay page includes all programs that have been already recorded.

According to another aspect of the embodiments of the present disclosure, a set top box is also provided. The set top box is configured to execute any method described above.

According to another aspect of the embodiments of the present disclosure, a program recording device is provided, which is applied to a set top box and includes: an acquisition module, configured to acquire first EPG information of a DVB and second EPG information of an OTT service; a selection module, configured to select a program to be recorded from a program list integrated with the first EPG information and the second EPG information; a determination module, configured to determine a program type of the program to be recorded; and a recording module, configured to record the program to be recorded according to the determined program type.

In an exemplary embodiment, the recording module includes: a first recording unit, configured to record, when it is determined that the program to be recorded pertains to a DVB television program, the program to be recorded by using an LPVR manner; a second recording unit, configured to record, when it is determined that the program to be recorded pertains to an OTT network video television program, the program to be recorded by using an NPVR manner; and a third recording unit, configured to record, when it is determined that the program to be recorded pertains to a DVB television program and an OTT network video television program simultaneously, the program to be recorded by using an NPVR manner.

In an exemplary embodiment, the device further includes: a first storage module, configured to store, when the program to be recorded is recorded by using the LPVR manner, the recorded program to be recorded on the set top box or an external storage device of the set top box; or, a second storage module, configured to store, when the program to be recorded is recorded by using the NPVR manner, the recorded program to be recorded on a network server corresponding to the set top box.

In an exemplary embodiment, the device further includes: a carrying module, configured to carry a type identifier in program description information about each program on the program list, herein, the type identifier is set to indicate one of the following information: a current program pertains to a DVB television program, a current program pertains to an OTT network video television program, or a current program pertains to a DVB television program and an OTT network video television program simultaneously.

By the embodiments of the present disclosure, a set top box is used to acquire first EPG information of a DVB and second EPG information of an OTT service, a program to be recorded is selected from a program list integrated with the first EPG information and the second EPG information, a program type of the program to be recorded is determined and the program to be recorded is recorded according to the determined program type. The problem in the related art that manners for recording programs by a set top box are too simple is solved, thereby reducing the complexity of user operation on a mixed-mode set top box. A user does not need to switch modules for recording, and can select more program sources for recording, broadcast television programs and network television programs are integrated, and the user does not need to care a program source.

After the drawings and the detailed descriptions are read and understood, other aspects may be understood.

DETAILED DESCRIPTION

It is important to note that embodiments in the present application and characteristics in the embodiments can be combined under the condition of no conflicts.

Figure 1:
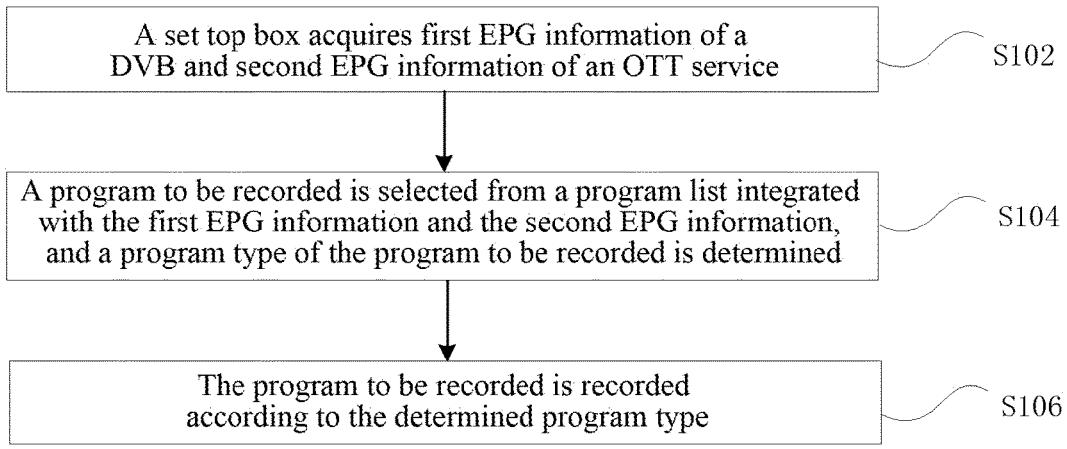
FIG. 1 is a flowchart of a program recording method according to an embodiment of the present disclosure.

In the embodiments of the present disclosure, a program recording method is provided. FIG. 1 is a flowchart of a program recording method according to an embodiment of the present disclosure. As shown in FIG. 1, the method includes the steps S102 to S106 as follows.

In step S102, a set top box acquires first EPG information of a DVB and second EPG information of an OTT service.

In step S104, a program to be recorded is selected from a program list integrated with the first EPG information and the second EPG information, and a program type of the program to be recorded is determined.

In step S106, the program to be recorded is recorded according to the determined program type.

By the above-mentioned steps, a set top box is used to acquire, first EPG information of a DVB and second EPG information of an OTT service, a program to be recorded is selected from a program list integrated with the first EPG information and the second EPG information, a program type of the program to be recorded is determined and the program to be recorded is recorded according to the determined program type. The problem in the related art that manners for recording programs by a set top box are too simple is improved, thereby reducing the complexity of user operation on a mixed-mode set top box. A user does not need to switch modules for recording, and can select more program sources for recording, broadcast television programs and network television programs are integrated, and the user does not need to care a program source.

There may be many implementation manners for the above-mentioned step S106. In an example, step S106 may be implemented by the following solution: when it is determined that the program to be recorded pertains to a DVB television program, the program to be recorded is recorded by using an LPVR manner; when it is determined that the program to be recorded pertains to an OTT network video television program, the program to be recorded is recorded by using an NPVR manner; and when it is determined that the program to be recorded simultaneously pertains to a DVB television program and an OTT network video television program, the program to be recorded is recorded by using an NPVR manner.

In an exemplary embodiment, after step S106 is executed, the following solution may also be executed. When the program to be recorded is recorded by using the LPVR manner, the set top box stores the recorded program to be recorded on the set top box or an external storage device of the set top box; or, when the program to be recorded is recorded by using the NPVR manner, the set top box stores the recorded program to be recorded on a network server corresponding to the set top box.

In an exemplary embodiment, in a practical application process, before determining a program type of the program to be recorded, the following process may also be executed: carrying a type identifier in program description information about each program on the program list. In an exemplary embodiment, the type identifier is set to indicate one of the following information: a current program pertains to a DVB television program, a current program pertains to an OTT network video television program, or a current program simultaneously pertains to a DVB television program and an OTT network video television program.

After the program to be recorded is recorded according to a determination result, the following solution may also be executed: generating a replay page. In an exemplary embodiment, the replay page includes all programs that are already recorded.

In the embodiments of the present disclosure, a set top box is also provided. The set top box is configured to execute any method described above.

It is important to note that for simple description, each of the above-mentioned method embodiments is expressed as a combination of a series of actions. However, those skilled in the art should know that the embodiments of the present disclosure are not limited by a described action sequence.

That is because some steps may be executed in other sequences or at the same time according to the embodiments of the present disclosure. Secondly, those skilled in the art should also know that embodiments described in the description are all exemplary embodiments, and involved actions and modules may not be necessary for the embodiments of the present disclosure.

The program recording method in the above-mentioned embodiment is illustrated hereafter with an example, but it is not intended to limit the embodiments of the present disclosure.

The above-mentioned method may be understood by the following steps A to E of the present example.

In step A, a set top box receives programs from a broadcast television and a network television, and integrates the programs to obtain a program list after integrating, program information seen in an EPG is also integrated.

In step B, after selecting a program to be recorded from the EPG, the set top box analyzes the program to be recorded, and determines, according to relevant program information, that the program to be recorded pertains to the broadcast television or the network television or the program exists in both the broadcast television and the network television.

In step C, an analysis result is processed separately, if the program pertains to a network television program, the program is recorded on a network by using an NPVR, and if the program pertains to a broadcast television program, the program is locally recorded by using an LPVR. If a certain program exists in both the broadcast television and the network television, the program may be recorded on a network by using an NPVR.

In step D, recorded program information is uniformly managed and displayed in a uniform page. The stored recorded program information contains a local program storage position or a network program storage position.

In step E, a user selects to replay a program that is already recorded, and acquires data from a corresponding position to replay the program according to different storage positions.

By using the above-mentioned solution provided in embodiments of the present disclosure, the complexity of user operation on a mixed-mode set top box is reduced, a user does not need to switch modules for recording, and can select more program sources for recording, broadcast television programs and network television programs are integrated, and the user does not need to care a program source. The program recording is uniformly managed and there will not be many copies for saving any longer, and a user can check all recording information about network recording and local recording from a recording management interface, and does not need to enter a plurality of applications to execute browsing operations, thereby simplifying a topological structure of a User Interface (UI) of the whole system. The whole PVR integration recording design solution will provide a better usage experience for the user.

Figure 2:
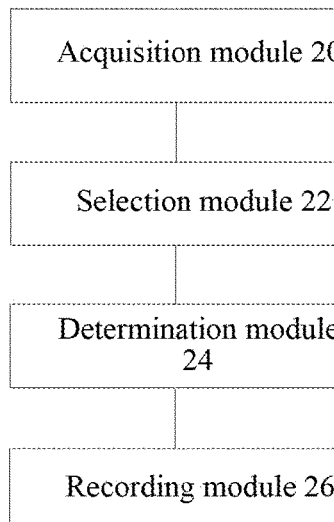
FIG. 2 is a structure block diagram of an EPG display device according to an embodiment of the present disclosure.

In the present embodiment, a program recording device is also provided. The program recording device is applied to a set top box and used to implement the above-mentioned embodiments and exemplary implementation manners. Those which have been illustrated will not be elaborated herein. Modules involved in the device will be illustrated hereinbelow. Just as used below, a term 'module' may implement the combination of software and/or hardware with predetermined functions. Although the device described by the following embodiment is better implemented by software, the implementation of hardware or the combination of software and hardware may be possible and conceived. FIG. 2 is a structure block diagram of a program recording device according to an embodiment of the present disclosure. As shown in FIG. 2, the device includes:

an acquisition module 20, configured to acquire first EPG information of a DVB and second EPG information of an OTT service;

a selection module 22, connected to the acquisition module 20, and configured to select a program to be recorded from a program list integrated with the first EPG information and the second EPG information;

a determination module 24, connected to the selection module 24, and configured to determine a program type of the program to be recorded; and a recording module 26, connected to the determination module 24, and configured to record the program to be recorded according to the determined program type.

Under an integration action of each module, a set top box is used to acquire first EPG information of a DVB and second EPG information of an OTT service, a program to be recorded is selected from a program list integrated with the first EPG information and the second EPG information, a program type of the program to be recorded is determined and the program to be recorded is recorded according to the determined program type. The problem in the related art that manners for recording programs by a set top box are too simple is solved, thereby reducing the complexity of user operation on a mixed-mode set top box. A user does not need to switch modules for recording, and can select more program sources for recording, broadcast television programs and network television programs are integrated, and the user does not need to care a program source.

Figure 3:
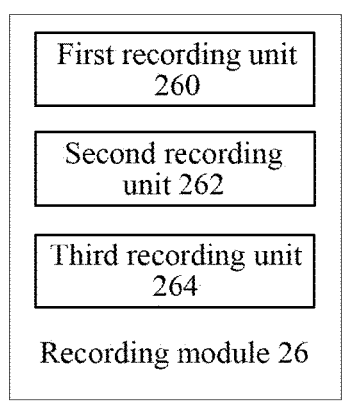
FIG. 3 is a structure block diagram of a recording module 26 of a program recording device according to an embodiment of the present disclosure.

FIG. 3 is a structure block diagram of a recording module 26 of a program recording device according to an embodiment of the present disclosure. As shown in FIG. 3, the recording module 26 includes: a first recording unit 260, configured to record, when it is determined that the program to be recorded pertains to a DVB television program, the program to be recorded by using an LPVR manner; a second recording unit 262, configured to record, when it is determined that the program to be recorded pertains to an OTT network video television program, the program to be recorded by using an NPVR manner; and a third recording unit 264, configured to record, when it is determined that the program to be recorded simultaneously pertains to a DVB television program and an OTT network video television program, the program to be recorded by using an NPVR manner.

Figure 4:
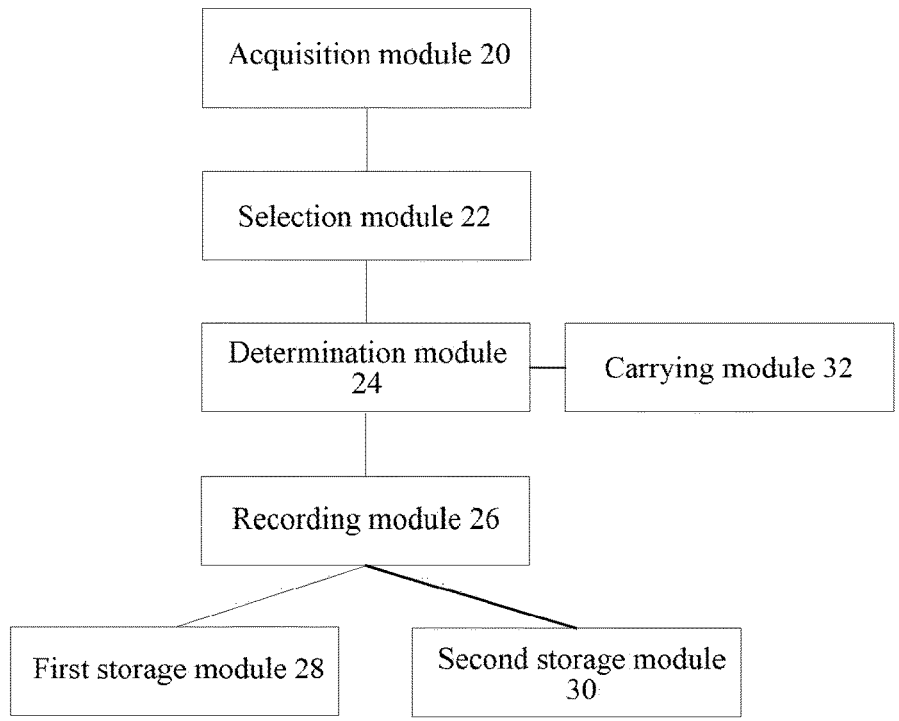
FIG. 4 is another structure block diagram of a program recording device according to an embodiment of the present disclosure.

In an exemplary embodiment, FIG. 4 is another structure block diagram of a program recording device according to an embodiment of the present disclosure. The device further includes: a first storage module 28, connected to the recording module 26, and configured to store, when the program to be recorded is recorded by using the LPVR manner, the recorded program to be recorded on the set top box or an external storage device of the set top box; and a second storage module 30, connected to the recording module 26, and configured to store, when the program to be recorded is recorded by using the NPVR manner, the recorded program to be recorded on a network server corresponding to the set top box.

In an exemplary embodiment, as shown in FIG. 4, the device further includes: a carrying module 32, configured to carry a type identifier in program description information about each program on the program list. In an exemplary embodiment, the type identifier is set to indicate one of the following information: a current program pertains to a DVB television program, a current program pertains to an OTT network video television program, or a current program simultaneously pertains to a DVB television program and an OTT network video television program.

An implementation process of the above-mentioned program recording device is illustrated hereinbelow with an example as follows.

The present example provides a set top box, which includes: a network television receiving module (equivalent to the acquisition module 20), a digital video broadcast receiving module (equivalent to the acquisition module 20), a program list integrating module, a local recording module (equivalent to the recording module 26), a network recording module (equivalent to the recording module 26), a recording management module, and a recording replay module.

The network television receiving module is configured to receive television program information issued by an IP network television.

The digital video broadcast receiving module is configured to receive a television program issued by a digital video broadcast system.

The local recording module is configured to locally copy program contents played by the set top box and to store the program contents in a local hard disk or another external storage device.

The network recording module is configured to send an instruction to a front-end system through a network, notify to record a certain program of a certain period, and store the program at a front-end server.

The program recording management module is configured to uniformly manage information of programs locally recorded and recorded on a network, the management includes recording appointment, current recording and recorded program classification. The program information is displayed to a user through a UI.

The recording replay module is configured to select a program which has already been recorded for the user, and to acquire stored data during recording to replay the program. The data comes from a network or is local.

In order to improve the adaptability of a set top box to a mixed network, to reduce the complexity of PVR recording through a mixed-mode set top box for a user, to improve the user experience of a dual-mode set top box and to enable the user to select more program sources during recording without switching working modes, the above-mentioned example provides a method and device for uniform recording under a program list after integrating, thus implementing integration of live and network program recording on the set top box. In terms of recording management, network recording and local recording are uniformly managed, such that the recording management is more convenient, and the user does not need to manage all recorded programs by browsing multiple application pages. With a program replaying function, the user may also more conveniently find all programs that can be replayed.

An embodiment of the present disclosure provides a set top box. The set top box includes any program recording device provided in embodiments of the present disclosure.

In order to better understanding for execution flows of the above-mentioned program recording method and device, the execution flows will be elaborated hereinbelow with an exemplary embodiment 1 to an exemplary embodiment 5.

Exemplary Embodiment 1

Figure 5:
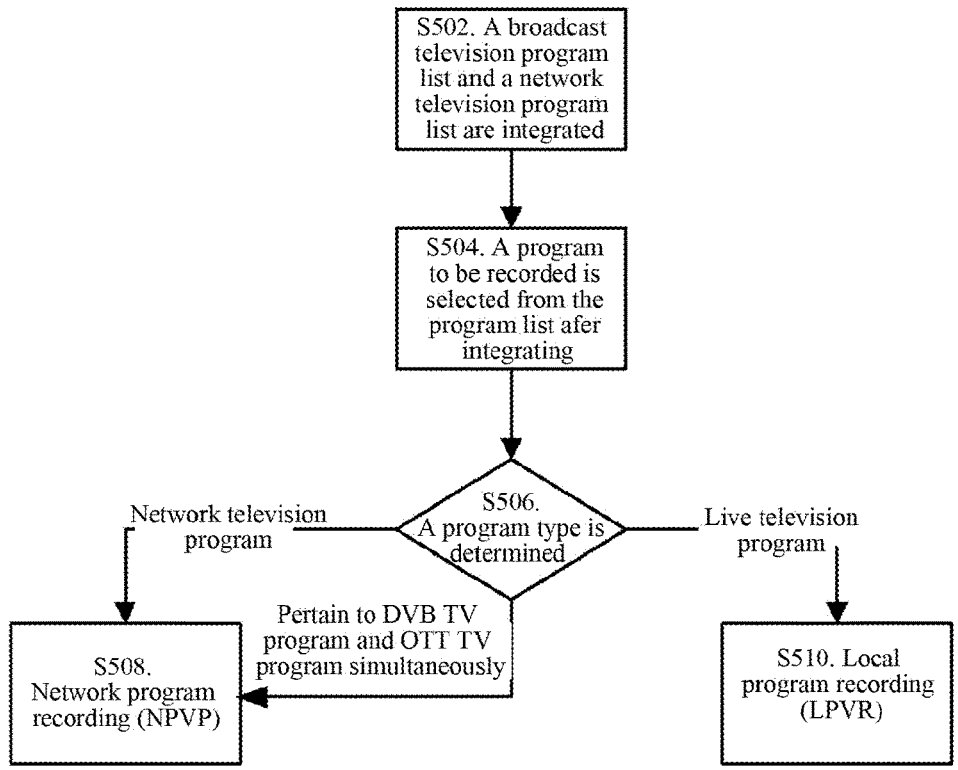
FIG. 5 is a flowchart of integration recording of a set top box according to an exemplary embodiment 1 of the present disclosure.

FIG. 5 is a flowchart of integration recording of a set top box according to an exemplary embodiment 1 of the present disclosure. As shown in FIG. 5, a solution of integration recording of a network program and a broadcast television program via a set top box includes the steps S502 to S510 as follows.

In step S502, a network television program list and a broadcast television program list are integrated in an EPG, and description for a program source type is added in program information description to indicate whether it pertains to a network television or a broadcast television.

In step S504, a user selects a program to be recorded from an EPG program information list integrated with a network television program and a broadcast television program.

In step S506, the program to be recorded is determined according to a type identifier of the program source, to judge whether a current program pertains to the network television program or the broadcast television program or simultaneously pertains to both.

In step S508, if the program pertains to the network television program, network recording (NPVR recording) is started, and if the program pertains to both simultaneously, it can be recorded on a network.

In step S510, if the program pertains to the broadcast television program, local recording (LPVR) is started.

If the program to be recorded simultaneously pertains to a DVB television program and an OTT network video television program, the program to be recorded is recorded by using an NPVR manner.

Exemplary Embodiment 2

Figure 6:
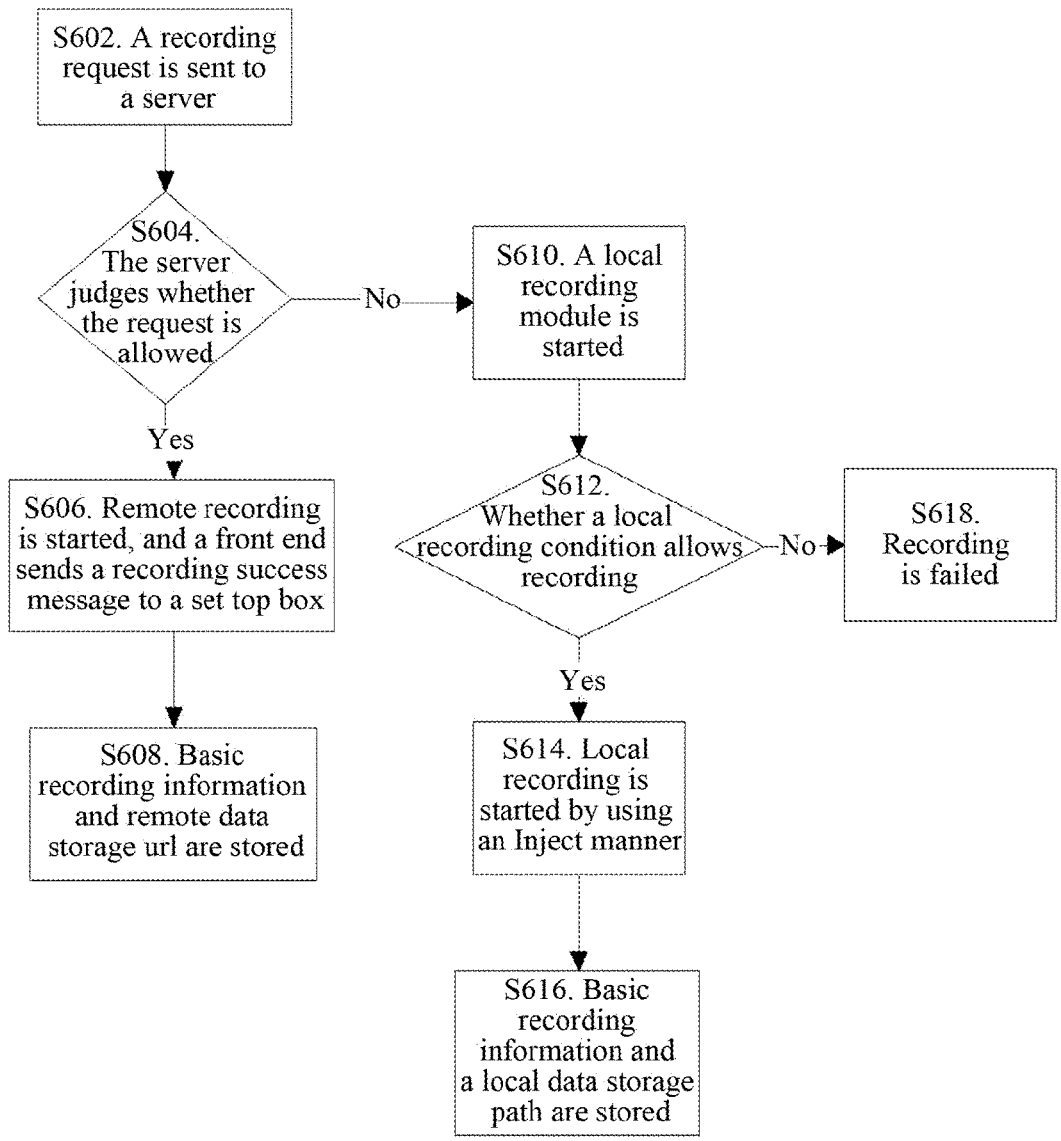
FIG. 6 is a flowchart for a network recording module of a set top box according to an exemplary embodiment 2 of the present disclosure.

FIG. 6 is a flowchart for a network recording module of a set top box according to an exemplary embodiment 2 of the present disclosure. A policy used for network recording is as shown in FIG. 2, and includes the steps S602 to S618 as follows.

In step S602, a set top box sends a program recording request to a front-end server.

In step S604, the server judges whether a requested program supports to be recorded, if so, step S606 is executed, and otherwise, step S610 is executed. In step S606, recording is started, and a recording success message is sent to the set top box.

In step S608, if the set top box receives a response, indicative of that remote network recording is already started, from the front-end server, recording information (information such as a program name and a recording time period) and a Uniform Resource Locator (URL) address of data storage for the program are recorded.

In step S610, if the set top box receives a recording failure message from the front-end server, a local recording module is started.

In step S612, it is judged whether a local recording condition allows recording, if so, step S614 is executed, and otherwise, step S618 is executed.

In step S614, local recording is started by using an Inject manner, and data is stored in an external storage device.

In step S616, basic recording information, including a program name, a recording starting/ending time, a recording type and the like, is stored, and a local storage path is recorded.

In step S618, recording is failed.

Exemplary Embodiment 3

Figure 7:
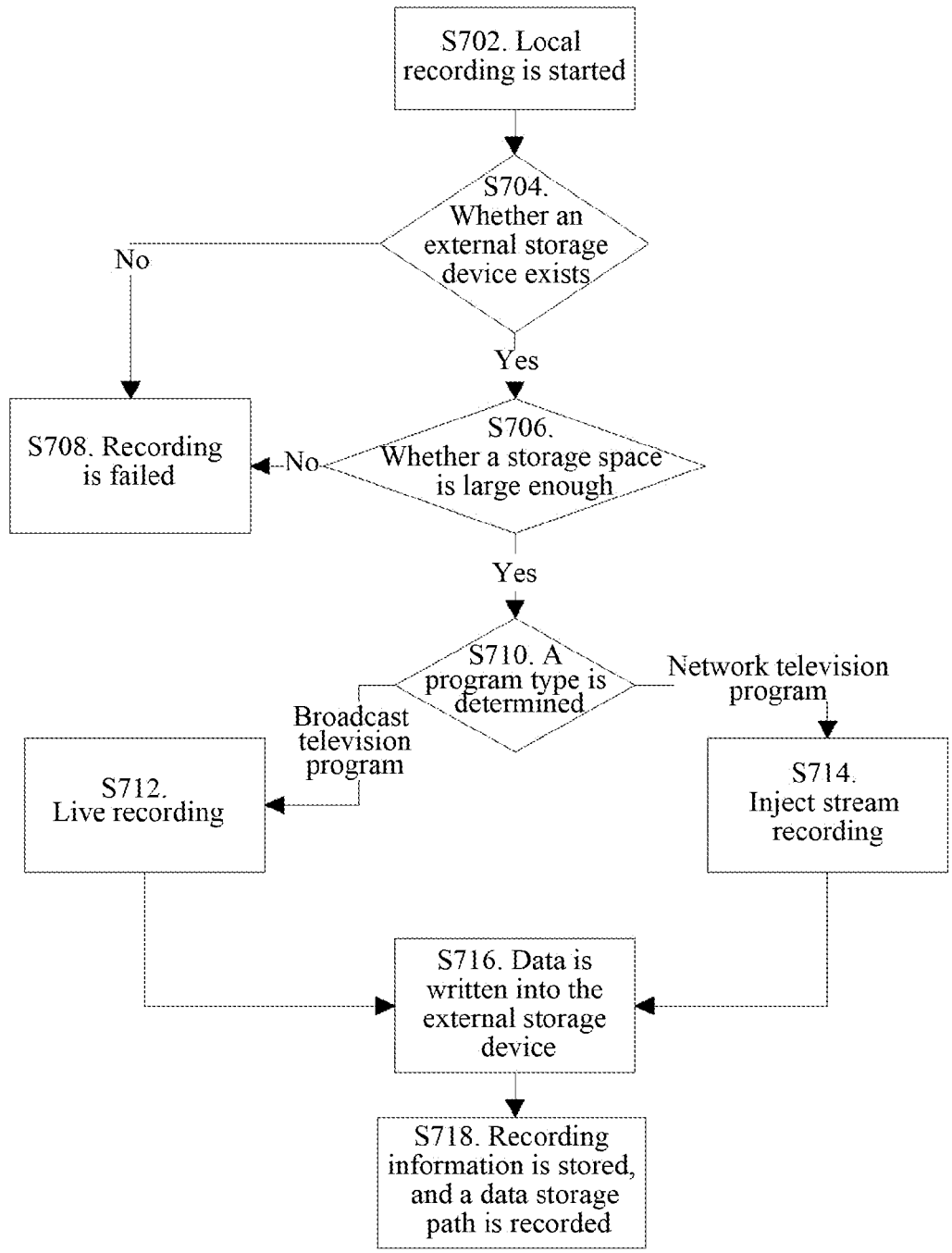
FIG. 7 is a flowchart for a local recording module of a set top box according to an exemplary embodiment 3 of the present disclosure.

FIG. 7 is a flowchart for a local recording module of a set top box according to an exemplary embodiment 3 of the present disclosure. As shown in FIG. 7, the flow includes the step S702 to S718 as follows.

In step S702, local recording is started.

In step S704, it is checked whether a USB external storage device of a set top box exists, if so, step S706 is executed, and otherwise, step S708 is executed.

In step S706, it is to continue to judge whether a storage space is large enough, and the remaining storage space must be larger than a threshold; if the remaining space is not larger than the threshold, step S708 is executed; and if the remaining space is larger than the threshold, it is determined that the condition is satisfied by the external storage device through detection, and step S710 is executed.

In step S708, local recording is failed.

In step S710, a program type of a program to be recorded is determined, if the program to be recorded pertains to a broadcast television program, step S712 is executed, and if the program to be recorded pertains to a network television program, step S714 is executed.

In step S712, recording is performed by using a live manner, data comes from a tuner, and TS stream data is obtained by setting a filter channel; and it is to continue to execute step S716.

In step S714, recording is performed by using an inject manner, and data comes from IP network transmission.

In step S716, the obtained data is written into the external storage device, and stored as a file with a specific format.

In step S718, program recording information, including a program name, a recording starting/ending time, a recording type and the like, is stored, and a file storage path is recorded.

Exemplary Embodiment 4

Figure 8:
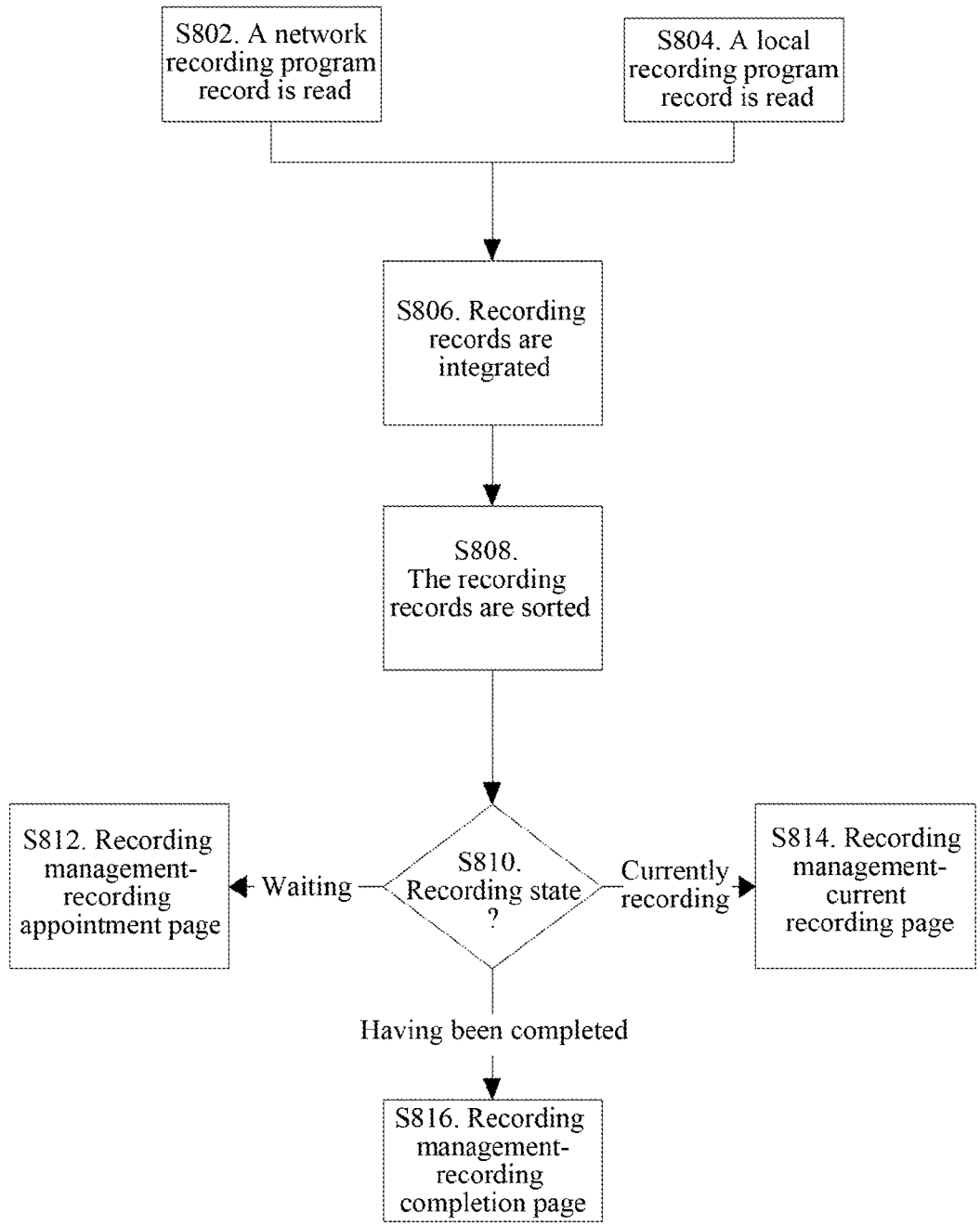
FIG. 8 is a flowchart of an interface display method for integration recording management of a set top box according to an exemplary embodiment 4 of the present disclosure.

FIG. 8 is a flowchart of an interface display method for integration recording management of a set top box according to an exemplary embodiment 4 of the present disclosure. As shown in FIG. 8, the flow includes the step S802 to S816 as follows.

In step S802, a network recording information record is read, which includes at least one of a program name, a program ID, a recording starting time, a recording state and a recording type.

In step S804, a local recording information record is read, which includes at least one of a program name, a program ID, a recording starting time, a recording state and a recording type.

In step S806, information record contents obtained in step S802 and step S804 are superposed together to obtain a recording information record list after integrating.

In step S808, the recording information record list after superposing in step S806 is sorted in an ascending order according to a program ID number.

In step S810, recording classification is performed according to the recording state recorded in the recording information.

In step S812, recording records for contents for which recording is not started are concluded to be displayed on a recording appointment page.

In step S814, recording records for contents which are currently being recorded are concluded to be displayed on a current recording page.

In step S816, recording records for contents for which recording has been completed are concluded to be displayed on a recording completion page, and a mark is made to indicate that replay is supported.

Exemplary Embodiment 5

Figure 9:
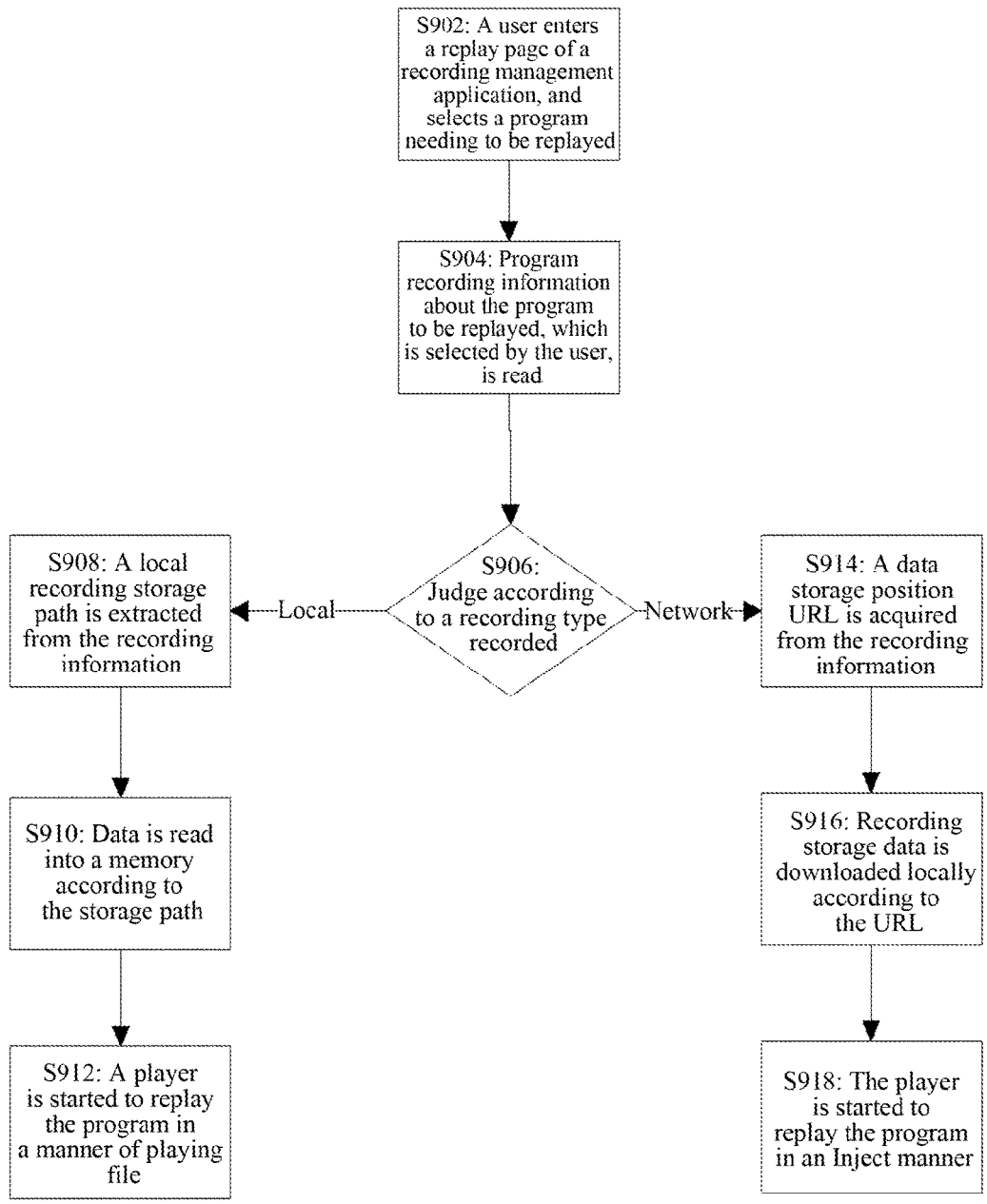
FIG. 9 is a flowchart for a replay module of a set top box according to an exemplary embodiment 5 of the present disclosure.

FIG. 9 is a flowchart for a replay module of a set top box according to an exemplary embodiment 5 of the present disclosure. As shown in FIG. 9, the flow includes the step S902 to S918 as follows.

In step S902, a user enters a recording replay page of a recording management application, and selects a program, which needs to be replayed, to be replayed.

In step S904, relevant recording information about the program to be replayed is read, which includes a recorded recording type, a data storage path or URL.

In step S906, it is judged whether the recording type is local recording or network recording according to the recording type.

In step S908, if the recording type is local recording, a local recording data storage path is extracted from the recording information.

In step S910, recording data is read from an external storage device into a memory according to the storage path.

In step S912, a player is started to replay the recorded program in a manner of playing file. In step S914, a URL for data storage of network recording is extracted from the recording information selected by the user.

In step S916, a data transmission channel is established between a set top box and a remote server according to the URL, and the network recording data is downloaded into the memory of the set top box.

In step S918, the player is started to replay the recorded program in an inject manner. To sum up, the embodiments of the present disclosure achieve the following effects. The problem in the related art that manners for recording programs by a set top box are too simple is solved, thereby reducing the complexity of user operation on a mixed-mode set top box. A user does not need to switch modules for recording, and can select more program sources for recording, broadcast television programs and network television programs are integrated, and the user does not need to care a program source.

In another embodiment, software is also provided. The software is used to execute the solution described in the above-mentioned embodiments and exemplary implementation modes.

The embodiments of the present disclosure also provide a computer-readable storage medium which stores computer-executable instructions, the computer-executable instructions are used to execute any program recording method provided in the embodiments of the present disclosure.

In another embodiment, a storage medium is also provided. The above-mentioned software is stored in the storage medium. The storage medium includes, but is not limited to, an optical disk, a floppy disk, a hard disk, an erasable memory and the like.

It is important to note that the specification and claims of the present disclosure and terms "first", "second" and the like in the drawings are intended to distinguish similar objects, and are not used to describe a specific sequence or a precedence order. It should be understood that objects used in such a way are exchangeable under appropriate conditions, thus the embodiments of the present disclosure described here can be implemented in a sequence besides sequences graphically shown or described here. In addition, terms "include" and "have" and any variants thereof are intended to cover non-exclusive inclusions. For example, processes, methods, systems, products or devices containing a series of steps or units does not need to clearly show those steps or units, and may include other inherent steps or units of these processes, methods, products or devices, which are not clearly shown.

An ordinary skilled in the art may understand that all or some of the steps of the above-mentioned embodiments may be implemented by using a computer program flow. The computer program may be stored in a computer-readable storage medium. The computer program is executed on a corresponding hardware platform (such as system, apparatus, device and component). During execution, the computer program includes one of the steps of the method embodiments or a combination thereof.

All or some of the steps of the above-mentioned embodiments may also be implemented by using an integrated circuit. These steps may be manufactured into individual integrated circuit modules respectively, or multiple modules or steps therein are manufactured into a single integrated circuit module.

The device/function module/function unit in the above-mentioned embodiments may be implemented by using a general computation device. They may be centralized on a single computation device or may be distributed on a network composed of multiple computation devices.

When being implemented in a form of software function module and sold or used as an independent product, the device/function module/function unit in the above-mentioned embodiments may be stored in a computer-readable storage medium. The above-mentioned computer-readable storage medium may be a read-only memory, a magnetic disk or an optical disk.

INDUSTRIAL APPLICABILITY

By the embodiments of the present disclosure, a set top box is used to acquire first EPG information of a DVB and second EPG information of an OTT service, a program to be recorded is selected from a program list integrated with the first EPG information and the second EPG information, a program type of the program to be recorded is determined and the program to be recorded is recorded according to the determined program type. The problem in the related art that manners for recording programs by a set top box are too simple is solved, thereby reducing the complexity of user operation on a mixed-mode set top box. A user does not need to switch modules for recording, and can select more program sources for recording, broadcast television programs and network television programs are integrated, and the user does not need to care a program source.

What we claim is:

1. A program recording method, comprising:
   acquiring, by a set top box, first Electronic Program Guide (EPG) information of a Digital Video Broadcast (DVB) and second EPG information of an Over-The-Top (OTT) service;
   selecting a program to be recorded from a program list integrated with the first EPG information and the second EPG information, and determining a program type of the program to be recorded; and
   recording the program to be recorded according to the determined program type
   wherein recording the program to be recorded according to the determined program type comprises:
   when it is determined that the program to be recorded pertains to a DVB television program, recording the program to be recorded by using a Local Personal Video Recorder (LPVR) manner;
   when it is determined that the program to be recorded pertains to an OTT network video television program, recording the program to be recorded by using a Network Personal Video Recorder (NPVR) manner; and
   when it is determined that the program to be recorded pertains to a DVB television program and an OTT network video television program simultaneously, recording the program to be recorded by using an NPVR manner.

2. The program recording method according to claim 1, wherein after recording the program to be recorded according to the determined program type, the method further comprises:
   when the program to be recorded is recorded by using the LPVR manner, storing, by the set top box, the recorded program to be recorded on the set top box or an external storage device of the set top box; or
   when the program to be recorded is recorded by using the NPVR manner, storing, by the set top box, the recorded program to be recorded on a network server corresponding to the set top box.

3. The program recording method according to claim 1, wherein before determining a program type of the program to be recorded, the method further comprises:
   carrying a type identifier in program description information about each program on the program list, wherein the type identifier is used to indicate one of the following information: a current program pertains to a DVB television program, a current program pertains to an OTT network video television program, or a current program pertains to a DVB television program and an OTT network video television program simultaneously.

4. The program recording method according to claim 1, wherein after recording the program to be recorded according to the determined program type, the method further comprises:
   generating a replay page, wherein the replay page comprises all programs which have been already recorded.

5. A program recording device, applied to a set top box, comprising a first processor and a first storage device, wherein the first storage device stores first processor-executable programs, and the first processor-executable programs comprise:
   an acquisition module, configured to acquire first Electronic Program Guide (EPG) information of a Digital Video Broadcast (DVB) and second EPG information of an Over-The-Top (OTT) service;
   a selection module, configured to select a program to be recorded from a program list integrated with the first EPG information and the second EPG information;
   a determination module, configured to determine a program type of the program to be recorded; and
   a recording module, configured to record the program to be recorded according to the determined program type,
   wherein the recording module comprises a second processor and a second storage device, wherein the second storage device stores second processor-executable programs, and the second processor-executable programs comprise:
   a first recording unit, configured to record, when it is determined that the program to be recorded pertains to a DVB television program, the program to be recorded by using a Local Personal Video Recorder (LPVR) manner;
   a second recording unit, configured to record, when it is determined that the program to be recorded pertains to an OTT network video television program, the program to be recorded by using a Network Personal Video Recorder (NPVR) manner; and
   a third recording unit, configured to record, when it is determined that the program to be recorded pertains to a DVB television program and an OTT network video television program simultaneously, the program to be recorded by using an NPVR manner.

6. The program recording device according to claim 5, the first processor-executable programs further comprise:

a first storage module, configured to store, when the program to be recorded is recorded by using the LPVR manner, the recorded program to be recorded on the set top box or an external storage device of the set top box; or a second storage module, configured to store, when the program to be recorded is recorded by using the NPVR manner, the recorded program to be recorded on a network server corresponding to the set top box.

7. The program recording device according to claim 5, the first processor-executable programs further comprise:

a carrying module, configured to carry a type identifier in program description information about each program on the program list, wherein the type identifier is set to indicate one of the following information: a current program pertains to a DVB television program, a current program pertains to an OTT network video television program, or a current program pertains to a DVB television program and an OTT network video television program simultaneously.

8. A set top box, comprising the program recording device according to claim 5.

* * * * *